UNITED STATES PATENT OFFICE.

THEODOR L. OEST, OF BERLIN, PRUSSIA, ASSIGNOR TO HENRY MAURER AND ADAM WEBER, OF NEW YORK CITY.

IMPROVED ENAMEL.

Specification forming part of Letters Patent No. 48,500, dated June 27, 1865.

*To all whom it may concern:*

Be it known that I, THEODOR LUDWIG OEST, of the city of Berlin, in the Kingdom of Prussia, at present residing in the city of New York, in the State of New York, have invented a new and Improved Enamel; and I do hereby declare that the following is a full and exact description thereof.

My improved enamel is particularly applicable for clay gas-retorts, where by its use the separation of the carbon and graphite is easily produced without requiring the reburning of the retort, and the retort receives at the same time a solidity whereby the exhausting operation may be altogether dispensed with.

The enamel consists of three and one-third ($3\frac{1}{3}$) parts of chemical pure clay, (alumni pura,) three and two-thirds ($3\frac{2}{3}$) parts of chalk, five (5) parts of feldspar, six and one-third ($6\frac{1}{3}$) parts of flint, three and two-thirds ($3\frac{2}{3}$) parts of heavy spar or baryta, four (4) parts of white glass, and three (3) parts of silicate of soda or soluble glass. The different ingredients are powdered finely and then mixed and roasted. When this manipulation is completed the substance is again powdered and finely ground and the coarser particles separated by water and then boiled for a length of time until the substance forms nearly a solid mass or paste.

This compound is then exposed to the atmosphere for three days, and is then again finely powdered, after which the same is ready for application.

What I claim as my invention, and desire to secure by Letters Patent, is—

An enamel-powder composed of the different parts mentioned, and in proportions substantially as specified and set forth.

THEODOR L. OEST.

Witnesses:
    HENRY E. ROEDER,
    DAVID MOSHER.